(12) United States Patent
Simmer

(10) Patent No.: US 8,695,798 B2
(45) Date of Patent: Apr. 15, 2014

(54) CASE FOR ELECTRONIC DEVICES

(71) Applicant: Case-Mate, Inc., Tucker, GA (US)

(72) Inventor: Garrett Paul Simmer, Atlanta, GA (US)

(73) Assignee: Case-Mate, Inc., Tucker, GA (US)

( * ) Notice: Subject to any disclaimer, the term of this patent is extended or adjusted under 35 U.S.C. 154(b) by 0 days.

(21) Appl. No.: 13/737,142

(22) Filed: Jan. 9, 2013

(65) Prior Publication Data

US 2013/0175186 A1 Jul. 11, 2013

Related U.S. Application Data

(60) Provisional application No. 61/584,557, filed on Jan. 9, 2012.

(51) Int. Cl.
*B65D 85/00* (2006.01)

(52) U.S. Cl.
USPC .......................................................... 206/320

(58) Field of Classification Search
USPC .......................... 206/320, 576, 701, 722, 724
See application file for complete search history.

(56) References Cited

U.S. PATENT DOCUMENTS

| | | | |
|---|---|---|---|
| 5,175,873 A | 12/1992 | Goldenberg et al. | |
| 6,471,056 B1 | 10/2002 | Tzeng | |
| 7,158,376 B2 | 1/2007 | Richardson et al. | |
| D582,149 S | 12/2008 | Tan | |
| D600,908 S | 9/2009 | Richardson et al. | |
| 7,594,576 B2 * | 9/2009 | Chen et al. | 206/320 |
| 7,609,512 B2 | 10/2009 | Richardson et al. | |
| D613,282 S | 4/2010 | Richardson et al. | |
| D615,535 S | 5/2010 | Richardson et al. | |
| D615,536 S | 5/2010 | Richardson et al. | |
| D617,784 S | 6/2010 | Richardson et al. | |
| D617,785 S | 6/2010 | Richardson et al. | |
| D619,574 S | 7/2010 | Richardson et al. | |
| D634,741 S | 3/2011 | Richardson et al. | |
| D636,386 S | 4/2011 | Richardson et al. | |
| 7,933,122 B2 | 4/2011 | Richardson et al. | |
| D638,005 S | 5/2011 | Richardson et al. | |
| D641,013 S | 7/2011 | Richardson et al. | |
| D642,170 S | 7/2011 | Johnson et al. | |
| D651,203 S | 12/2011 | Michie et al. | |
| 8,320,597 B2 | 11/2012 | Griffin, Jr. et al. | |
| 8,430,240 B2 | 4/2013 | Kim | |
| 8,453,835 B2 * | 6/2013 | So | 206/320 |
| 2005/0139498 A1 * | 6/2005 | Goros | 206/320 |
| 2009/0114556 A1 * | 5/2009 | Tai et al. | 206/320 |
| 2010/0048267 A1 | 2/2010 | Lin | |
| 2010/0096284 A1 * | 4/2010 | Bau | 206/320 |
| 2010/0270189 A1 * | 10/2010 | Pedersen et al. | 206/320 |

(Continued)

OTHER PUBLICATIONS

International Search Report and Written Opinion for PCT/US2013/020749; Apr. 5, 2013; 9 pgs.

*Primary Examiner* — Jacob K Ackun
(74) *Attorney, Agent, or Firm* — Gardner Groff Greenwald & Villanueva, PC

(57) ABSTRACT

A mobile device case comprising separate inner and outer layers, wherein the inner layer comprises a flexible form-fit bumper that protects an electronic device installed therein without significantly covering the front and back of the device, and wherein the outer layer comprises a form-fit shell that interfaces with the inner bumper and extends on at least one face of the device excluding the front of the device.

16 Claims, 8 Drawing Sheets

(56) References Cited

U.S. PATENT DOCUMENTS

| | | |
|---|---|---|
| 2011/0192510 A1 | 8/2011 | Bau |
| 2011/0192743 A1* | 8/2011 | May et al. .................. 206/320 |
| 2012/0031788 A1* | 2/2012 | Mongan et al. ............. 206/320 |
| 2012/0031914 A1 | 2/2012 | Liu |
| 2012/0037524 A1* | 2/2012 | Lonsdale et al. ............ 206/320 |
| 2012/0055826 A1* | 3/2012 | Nishimura .................. 206/320 |
| 2012/0103844 A1* | 5/2012 | Piedra et al. ................ 206/320 |
| 2012/0305422 A1* | 12/2012 | Vandiver ..................... 206/320 |

* cited by examiner

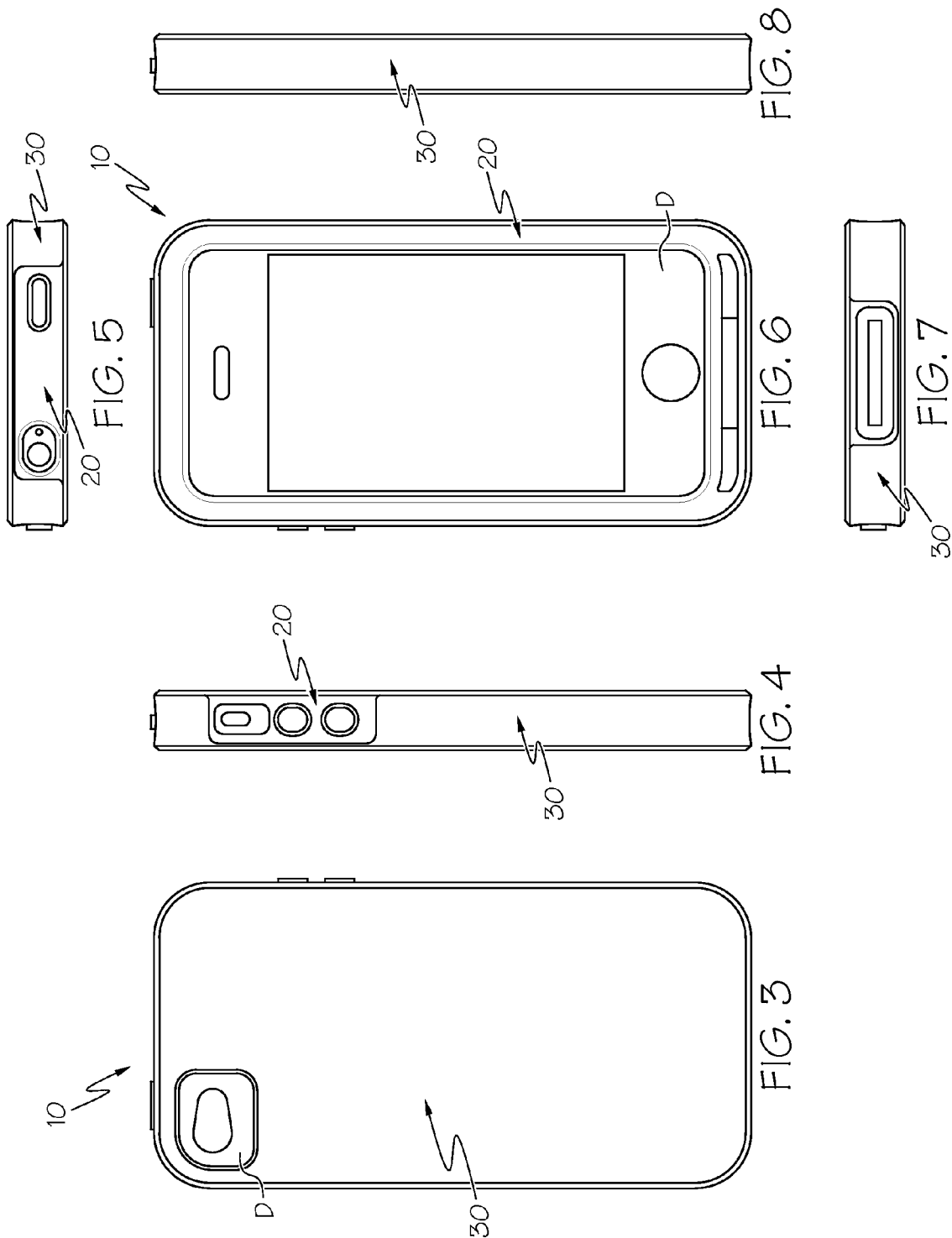

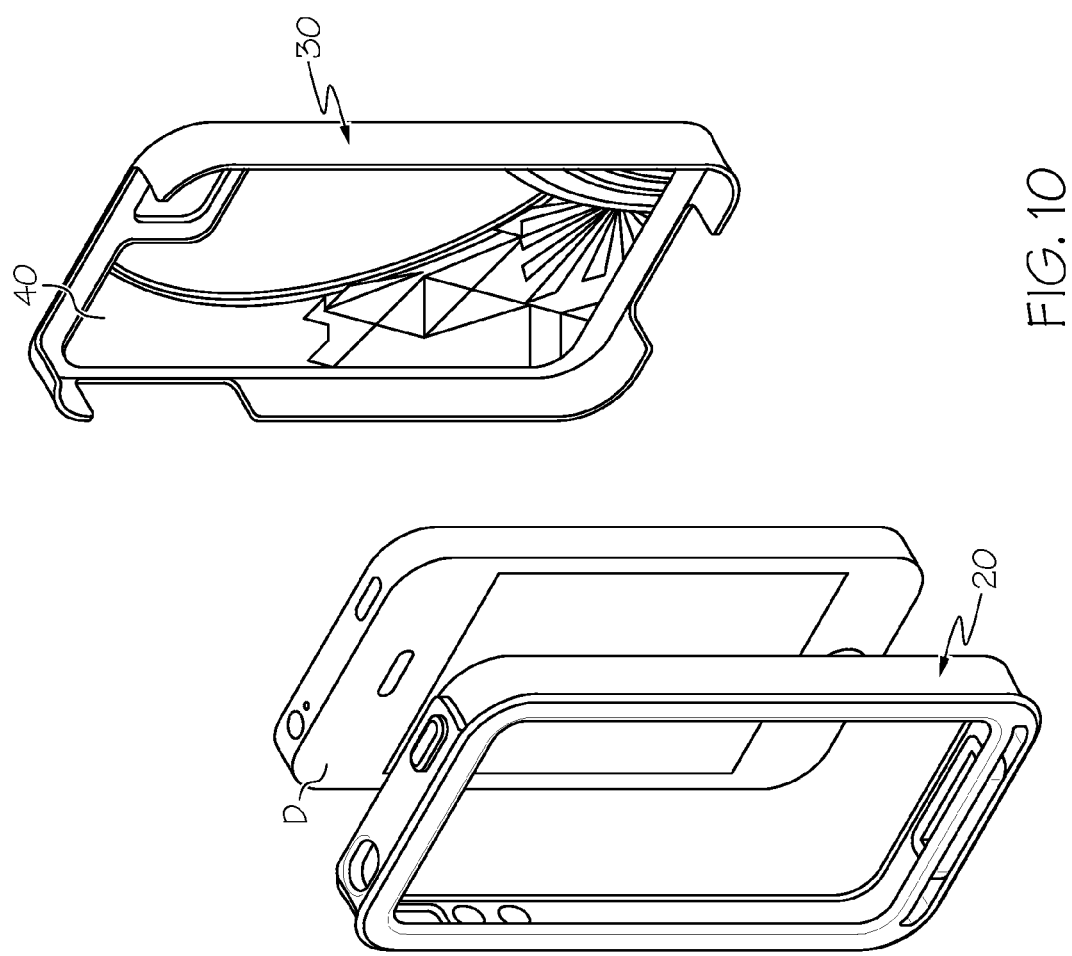

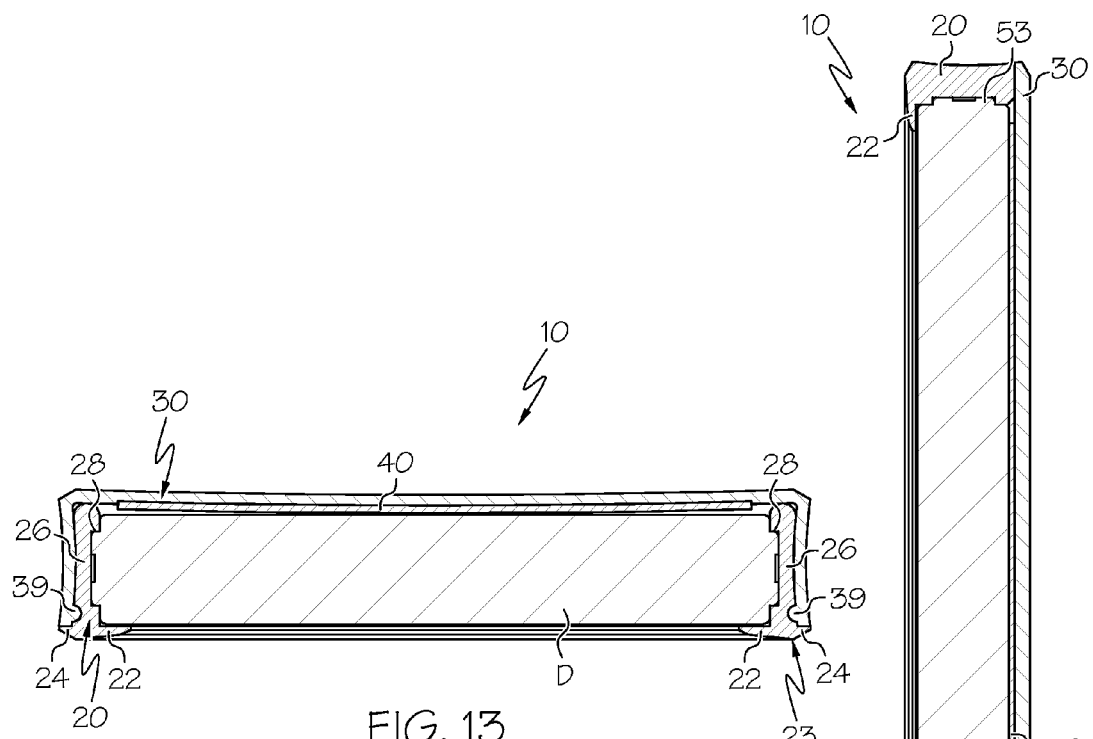
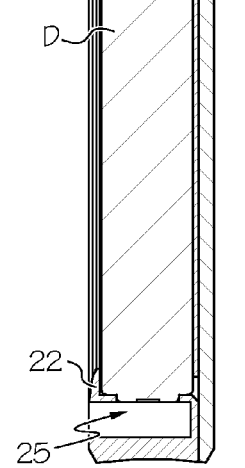
FIG. 13
FIG. 14

CASE FOR ELECTRONIC DEVICES

CROSS-REFERENCE TO RELATED APPLICATION

This application claims the benefit of U.S. Provisional Patent Application Ser. No. 61/584,557 filed Jan. 9, 2012, the entirety of which is hereby incorporated herein by reference.

TECHNICAL FIELD

The present invention relates generally to the field of protective cases for electronic devices

BACKGROUND

Protective and/or decorative cases are used in connection with electronic devices such as cell phones, smart phones, MP3 players and other portable music and/or video players, electronic readers, tablet computers, handheld game devices, and the like. It is to the provision of an improved case for electronic devices that the present invention is primarily directed.

SUMMARY

In example embodiments, the present invention provides an improved case for electronic devices. In one aspect, the present invention relates to a two-part mobile device case with inner and outer layers where inner layer consists of a flexible form-fit bumper that protects the device without significantly covering the front, and optionally without significantly covering the back, of the device; and the outer form-fit shell interfaces to the inner bumper and extends on all faces except the front of the device.

In another aspect, the invention relates to a two-part mobile device case with inner and outer layers where inner layer consists of a flexible form-fit bumper that protects the device without significantly covering the front and/or the back of the device, and the outer form-fit shell interfaces to the inner bumper and extends on all faces except the front of the device.

In another aspect, the invention relates to a method of assembling a case for an electronic device. The method includes mounting a resilient inner frame member about at least a portion of the periphery of the electronic device, and inserting the assembly of the electronic device and the inner frame member into an outer shell member.

In another aspect, the invention relates to a case for protecting an electronic device with a plurality of sidewalls extending between a screen and a rear surface. The case includes a flexible bumper with a plurality of sidewalls having a receiver extending along at least one of the plurality of sidewalls. The receiver is configured to receive at least one of the plurality of electronic device sidewalls. The case also includes a base shell that is configured to removably secure the bumper and electronic device.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIGS. 3-8 show several orthogonal views of the case for an electronic device shown in FIG. 1.

FIGS. 9-12 show a sequence of assembly of the case shown in FIG. 1, as installed on an electronic device, in example form.

FIG. 13 is a first cross-sectional view of the case for an electronic device shown in FIG. 1 as viewed along line 13 in FIG. 12.

FIG. 14 is a second cross-sectional view of the case for an electronic device shown in FIG. 1 as viewed along line 14 in FIG. 12.

DETAILED DESCRIPTION OF EXAMPLE EMBODIMENTS

Figure 1:
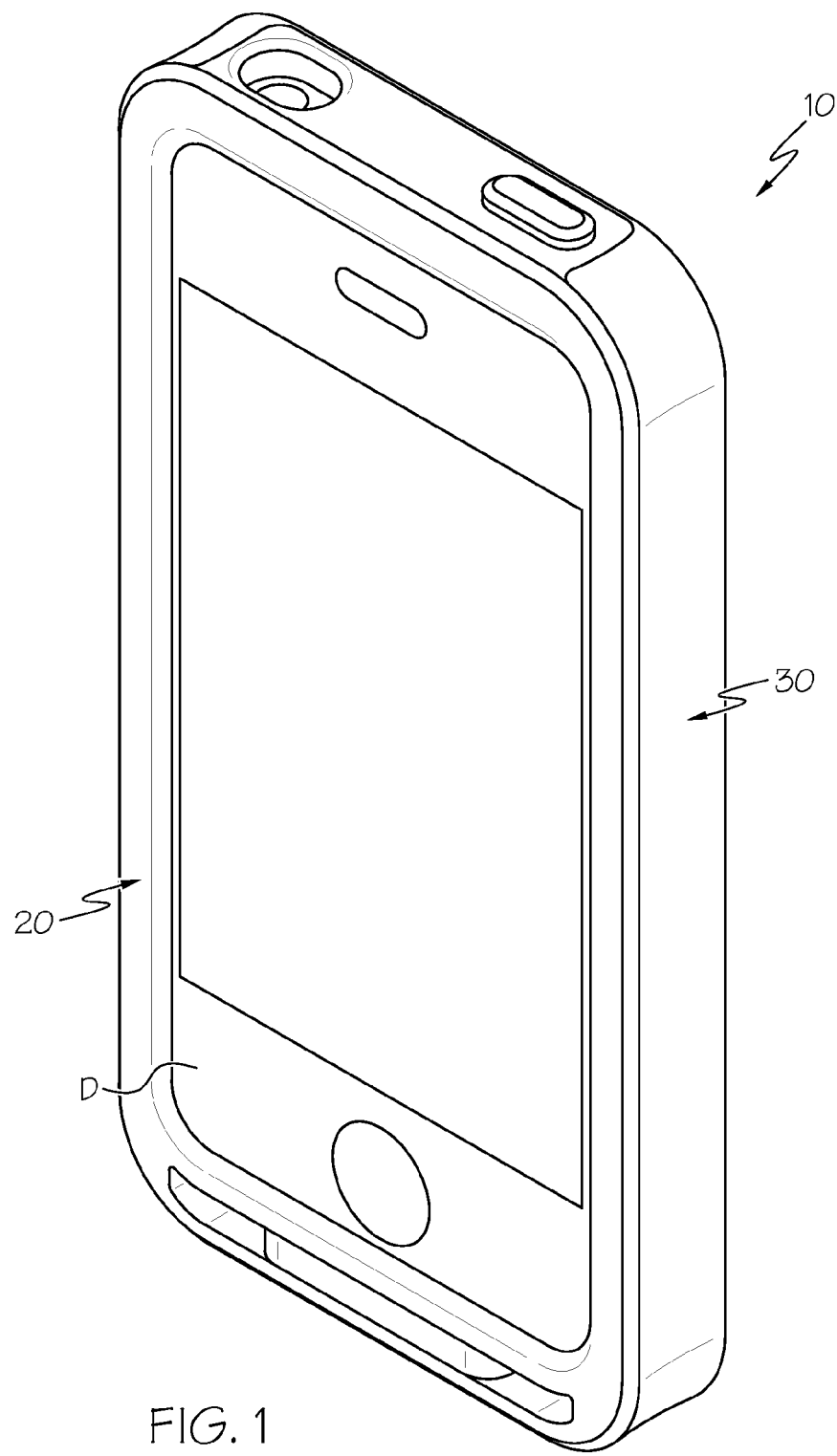
FIG. 1 shows a front perspective view of a case for an electronic device according to an example embodiment of the present invention.
Figure 2:
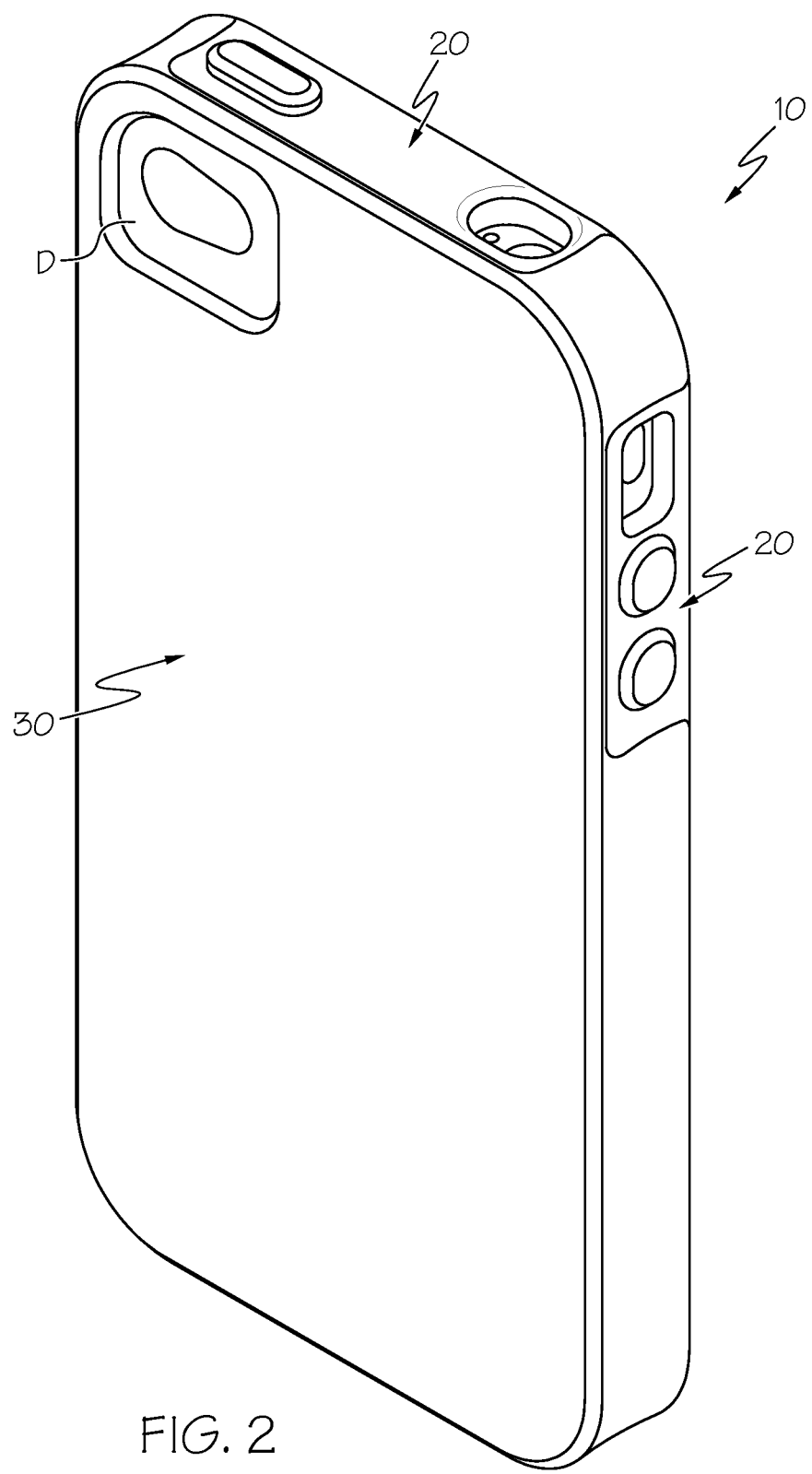
FIG. 2 is a rear perspective view of the case for an electronic device shown in FIG. 1.
Figure 9:
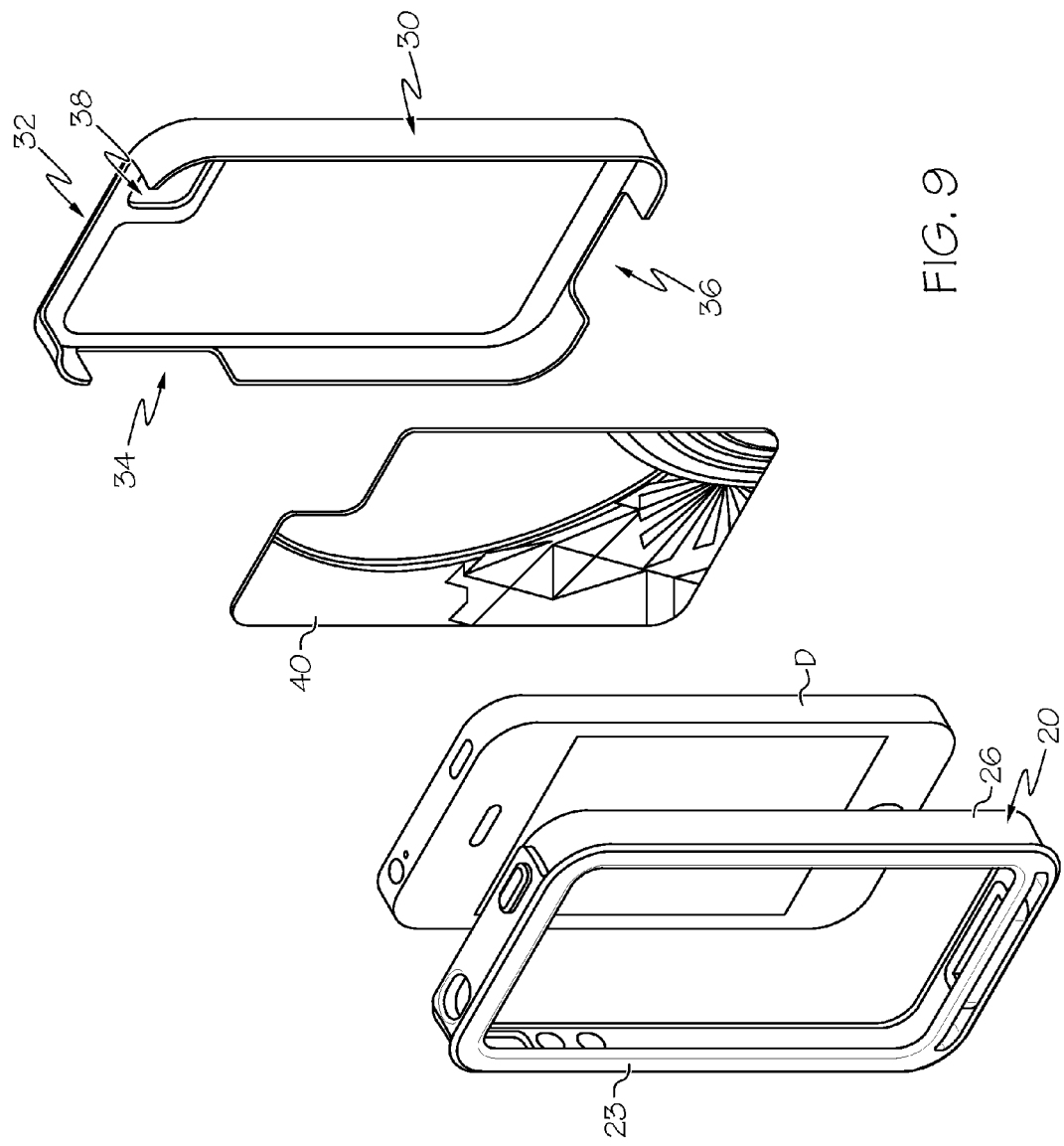
Figure 12:
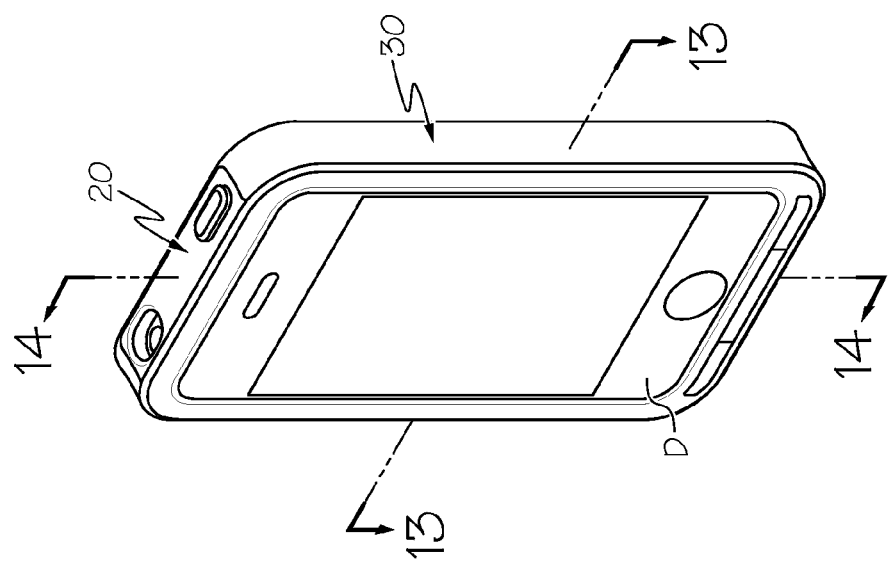
Figure 11:
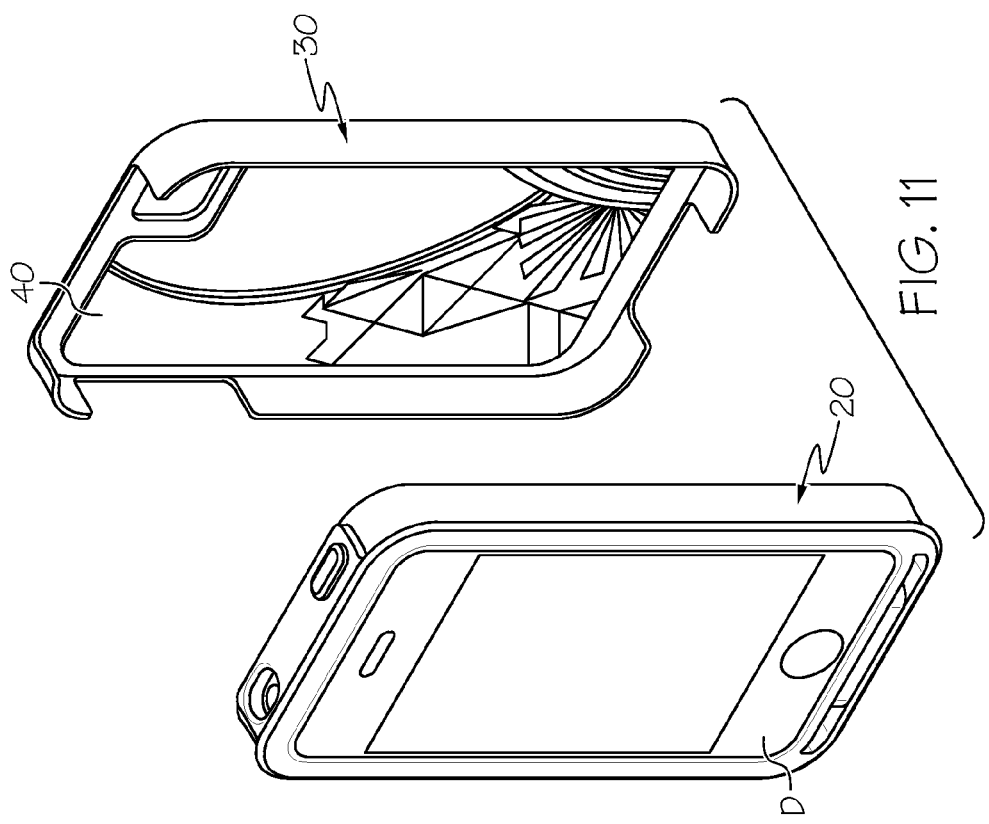

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-15B show a protective case 10 for holding an electronic device D according to an example form of the invention. The electronic device D may, for example, take the form of a cell phone, smart phone, MP3 player or other portable music and/or video player, electronic reader, tablet computer, handheld game device, or the like.

The case 10 may take the form of a custom printed case fabricated using a die sublimation printing process, a case printed using water decal or water transfer printing, or any of a variety of other case formats. In non-custom embodiments, one or more standard graphic images may be utilized for mass production. In alternate forms, the case 10 is produced without printed images, and/or optionally can be painted, provided with a soft coat, or a metallic silver finish.

In example forms, the case 10 generally comprises a mobile device case, for example a two-part case with an inner layer or sleeve 20 and an outer layer or shell 30 that can removably engage with respect to each other. The inner layer 20 preferably comprises a flexible form-fit bumper that protects the electronic device without significantly covering the front and back of the device D. This inner layer bumper 20 is preferably constructed of soft and/or flexible material, for example plastic or rubber and more preferably thermoplastic polyurethane, and provides a degree of resilience or compressibility to protect the electronic device from impacts. Preferably, the inner layer bumper 20 has a continuous unitary construction with four sides forming a generally rectangular frame shape. The inner layer bumper 20 also is depicted to have an open center between the four sides. The bumper 20 also preferably has a face surface 23 and a collar 26. The collar 26 extends generally perpendicularly from the rear surface of the face 23. The collar 26 can have a straight, slightly concave or slightly convex disposition. The inner layer bumper 20 can have one or more raised protrusions 53 positioned along the outer surface of the collar 20. Preferably, more than one raised protrusions 53 are included at multiple positions along the outer surface of the collar 20. The inner layer bumper 20 can also have one or more apertures 57 extending through the collar 20 and/or the face 23. The one or more apertures 57 are designed to align with and provide access to input/output jacks or connection ports on a particular electronic device D.

As shown in FIGS. 13 and 14, the inner layer bumper 20 can have a subtle undercut geometry to receive the electronic device D and to engage with the outer layer shell 30. The undercut geometry can include one or more inwardly-directed lips 22 forming part of the face 23. These one or more lips 22 can extend inwardly from each of the four sides of the face 23 forming a continuous annular lip. These one or more lips 22 engage the outer edges of the front surface of the electronic device D. The collar 26 can also include one or more ridge grips 28 extending inwardly from the distal end of the collar opposite the connection with the face 23. The inner layer bumper 20 can include one of these ridge grips 28 positioned along one edge or alternatively, it can include more than one of these ridge grips 28 positioned on multiple edges. The combination of the lip 22 and the one or more ridge grips 28 provides a receiver within which the electronic device D can be removably inserted and secured to retain the bumper in place on the electronic device.

The undercut geometry can also include one or more outwardly-extending ledges 24 as part of the face 23 extending in the opposite direction from the one or more lips 22. Preferably, these one or more ledges 24 are positioned along each side of the face 23 forming a continuous ledge. Alternatively, the one or more ledges 24 can be interrupted by the raised protrusions 53, which can have a height that is generally similar to the ledge length. In assembly, as described below, when the inner layer bumper 20 is secured within the outer shell 30, the one or more ledges 24 align over the distal end of the one or more side walls. As depicted, a recessed channel extends along the outer surface of the collar 26 immediately beneath the one or more ledges 24. This channel can be continuous around the collar 26. Alternatively, this channel can be interrupted by the raised protrusions 53.

Figure 15B:
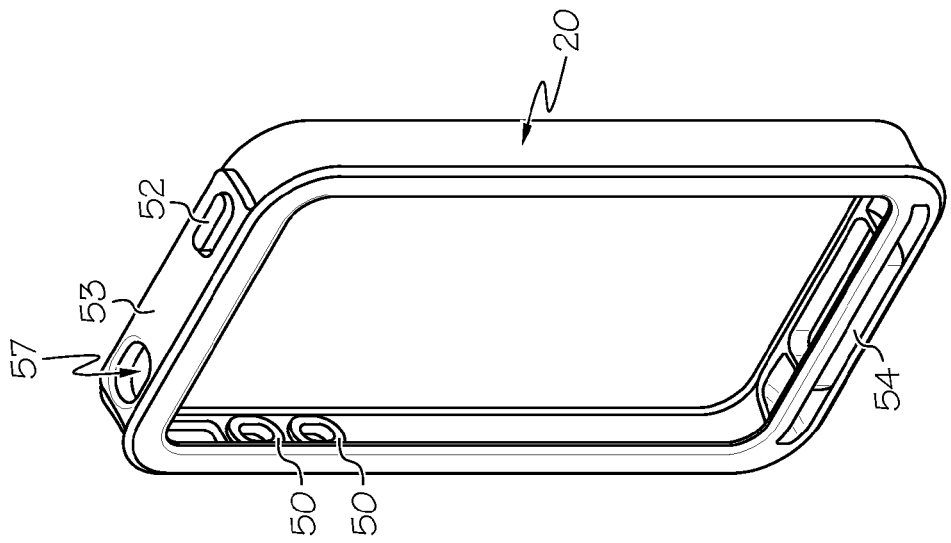
FIGS. 15A and 15B are isolated exploded and assembled views of an inner layer bumper of the case shown in FIG. 1 according to an example embodiment.
Figure 15A:
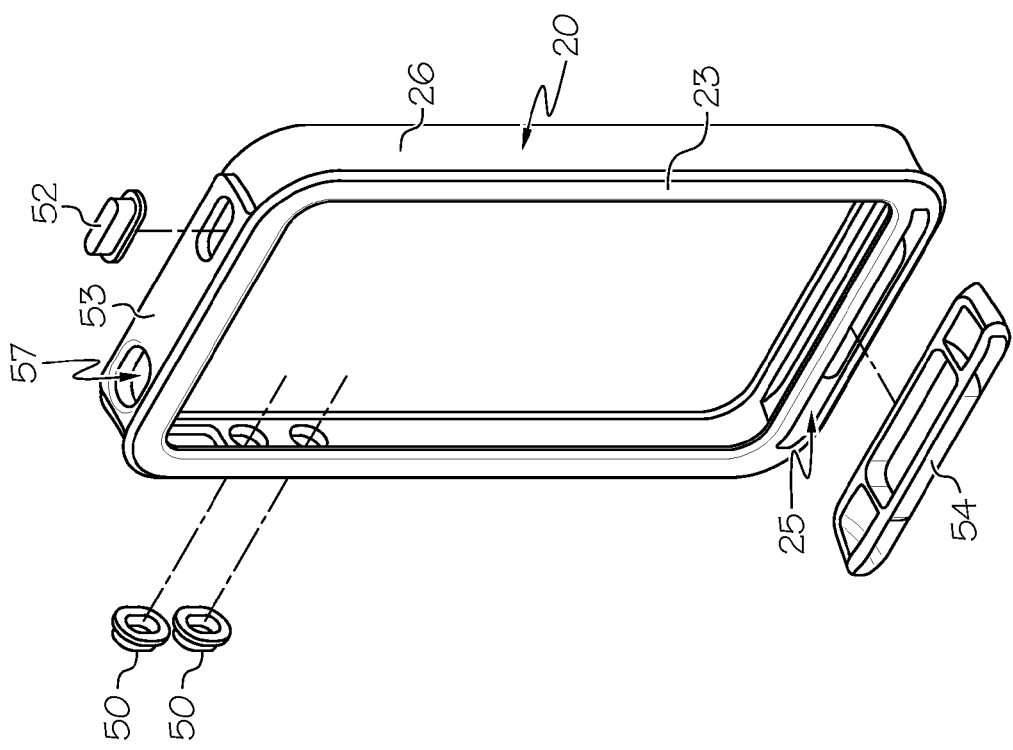

The inner layer bumper 20 can also include one or more hard molded-in features to optimize button feel and/or overall part rigidity. FIGS. 15A and 15B show button and port insert components 50, 52, 54 for assembly with the inner layer bumper 20 according to an example form of the invention. These hard molded-in features 50, 52, 54 preferably align with operational buttons on the device D to be secured within the bumper 20. The bumper 20 can also have a through-way aperture 25 extending through a section of the face 23, preferably along the bottom side of the bumper as shown. The through-way aperture 25 can be designed to receive port insert component 54 having audio passageways.

The outer shell 30 can have a continuous unitary construction with a base and one or more side walls extending perpendicularly from the edge of the base. The one or more side walls can have a straight, slightly concave or slightly convex disposition designed to mirror and align with the disposition of the inner layer bumper collar 23, described above. The outer layer form-fit shell 30 preferably interfaces with a close fit over the inner bumper 20 and optionally extends on all faces except the front of the device D. This outer shell 30 can be constructed of a rigid and durable material, for example plastic or more preferably polycarbonate. Alternatively the outer shell 30 can be constructed of metal. The one or more side walls can have one or more cut-outs 32, 34, 36 depending on the particular electronic device D to be encased. These cut-outs 32, 34, 36 are positioned to align with input/output ports and/or buttons on the particular electronic device D to be supported. During assembly, as described above, the one or more protrusions 53 on the bumper collar 26 align and fit within these one or more cutouts 32, 34, 36 in the outer shell 30. As specifically depicted in FIG. 13, the one or more side walls can also have a catch 39 positioned on the inner-facing surface near the distal end of the one or more side walls opposite the base. An example catch 39 can be a bump or lip integral with the sidewall. The catch 39 can extend along the entire length of the one or more side walls or alternatively can be interrupted by the cut-outs 32, 34, 36. During assembly, the catch 39 fits and presses into the channel on the outer surface of the inner bumper collar 26, described above. The outer shell 30 can also have a window 13 positioned within the base to align with a camera on the device D.

A soft flat member or backing panel 40 is optionally bonded or otherwise secured to the interior of the back wall or base of the outer shell 30 for impact resistance, fit, or decorative purposes, and optionally can be decorated with textured patterns, geometry, images, text and/or colors. FIGS. 4-7 show the sequence of an example assembly method, and FIGS. 1-3, 8 and 9 show an assembled case 10 and the associated electronic device D. Optionally, various outer shells 30 can be swapped out without having to remove the device D from the protective inner bumper 20.

When the device D is secured within the bumper 20, the bumper is inserted into the outer shell 30. When inserted, the outwardly-extending ridges or grips 37 of the bumper 20 align over the free distal edge of the outer shell 30 wall. The cross-sectional view of FIG. 8 shows the interengaging concave and convex surface features of the peripheral walls of the inner 20 and outer 30 case members, whereby the case assembly 10 is releasably coupled together. The bumper 20 and shell 30 are of complementary size and shape, such that when the bumper is inserted with the electronic device into the shell, the material of the bumper is snugly engaged and/or compressed between the electronic device and the shell, thereby providing a frictional and/or compression fit engagement to retain the components in their assembled configuration installed on the electronic device.

Otherwise described, example forms of the invention comprise a two-part mobile device case 10 with separate inner 20 and outer 30 layers that form a secure engagement with one another when installed on the protected device, without being permanently attached, whereby the inner and outer layers are freely separable upon removal of the case from the protected device. The inner layer comprises a flexible form-fit bumper defining an outer frame or ring of compressible, flexible and/ or resilient material that protects the device D from impact, without significantly covering at least a screen portion of the front of the device, and optionally without significantly covering the front and the back of the device. The outer form-fit shell interfaces to the inner bumper and extends on all faces except the front of the device, providing a hard covering over at least a portion of the back and sides of the protected device.

Optionally, the inner bumper 20 includes a built-in thin clear screen protection feature, such as a sheet or panel of screen protection material secured on the front-facing surface. This thin clear screen can be secured to the front-facing surface through an adhesive, static or surface attraction; and/or can be permanently or detachably secured to the bumper.

The invention also includes a method of assembling a protective case 10 for an electronic device D, for example as shown and described above, including mounting the inner bumper onto the device, attaching the outer shell 30 to the inner bumper 20 with a compression fit, friction fit, and/or an undercut geometry that extends around the perimeter to retain the shell. A soft flat member 40 is optionally bonded to the interior of the back wall base of the outer shell 30, or otherwise positioned between the device and the back wall of the shell, whereby the soft member can optionally be decorated with textured patterns, geometry, or multiple colors that would otherwise not be seen once the inner bumper is attached to the device D. One or more outer shells 30 of various color and/or designs may optionally be provided, and interchangeably swapped out without having to remove the protective inner bumper 20. The predominantly soft inner bumper 20 optionally includes one or more hard, molded-in features to optimize button feel and/or overall part rigidity.

While the invention has been described with reference to preferred and example embodiments, it will be understood by those skilled in the art that a variety of modifications, additions and deletions are within the scope of the invention, as defined by the following claims.

What is claimed is:

1. A mobile device case for protecting an electronic device, the case comprising an inner layer and an outer layer, wherein the inner layer comprises a resilient rectangular-shaped flexible form-fit bumper comprising four sides and an open center, the four sides comprising a face surface and a collar extending generally perpendicularly from the face surface, wherein the face surface comprises one or more inwardly-directed lips and one or more outwardly-extending ledges, the bumper further comprising one or more raised protrusions extending from the collar to the one or more ledges, wherein the outer layer comprises a form-fit hard shell that interfaces and conforms with the inner layer bumper and comprises a base and one or more side walls extending perpendicularly therefrom, and wherein the side walls comprise one or more cutouts configured for receiving the one or more raised protrusions of the bumper.

2. The case of claim 1, wherein the outer shell comprises a catch for engaging a channel extending along the collar to secured the inner bumper to the shell.

3. The case of claim 1, further comprising a backing panel insert secured to an internal face of a back panel of the outer layer of the case, to provide cushioning between the back panel and an electronic device installed in the case when assembled.

4. The case of claim 1, comprising a plurality of different outer shells configured to interchangeably engage the protective inner bumper.

5. The case of claim 1, wherein the inner bumper comprises a flexible construction and comprises one or more hard molded-in features to optimize button feel and/or overall part rigidity.

6. The case of claim 1, wherein the inner bumper comprises a pair of opposing grips configured to receive the electronic device.

7. The case of claim 1, wherein the ledge of the inner bumper is configured to engage the one or more side walls of the shell.

8. A two-part mobile device case for protecting a mobile device, wherein the case comprises an inner layer and an outer layer, the inner layer comprising a resilient rectangular-shaped four-sided flexible form-fit bumper having a front face surface and a collar extending generally perpendicularly from the face surface, the face surface comprising an inwardly directed lip and an outwardly-extending ledge, the collar comprising one or more protrusions extending therefrom and abutting the ledge, and the outer layer comprising a form-fit hard shell having a base and one or more side walls extending perpendicularly therefrom, wherein the one or more side walls comprise one or more cutouts configured for receiving the one or more protrusions of the collar.

9. The two-part mobile device case of claim 8, wherein the inner bumper comprises a screen protector to cover at least a portion of the electronic device.

10. The two-part mobile device case of claim 8, wherein the case is assembled by attaching the outer shell to the inner bumper such that a catch of the outer shell releasably engages a channel extending around at least a portion of the perimeter of the inner bumper.

11. The two-part mobile device case of claim 8, further comprising a backing panel insert secured to an internal face of a back panel of the outer layer of the case for positioning between the back panel and an electronic device installed in the case when assembled.

12. The two-part mobile device case of claim 8, further comprising one or more additional outer shells configured to be interchangeably mounted onto the protective inner bumper.

13. The two-part mobile device case of claim 8, wherein the inner bumper comprises soft construction and comprises harder molded-in features to optimize button feel and/or overall part rigidity.

14. A case for protecting an electronic device, the electronic device having a plurality of device sidewalls extending between a front screen surface and a rear surface, the case comprising:
   a resilient rectangular-shaped flexible bumper comprising four sides defining a receiver that is configured to receive the electronic device and engage the device sidewalls when assembled, the four sides comprising a front face and a collar extending generally perpendicularly from the face, the front face defining an inwardly-directed lip for contacting the front screen surface of the electronic device and an outwardly-extending ledge, and the collar comprising one or more protrusions extending therefrom and abutting the ledge; and
   a substantially rigid shell configured to removably mount over the bumper and retain the case in an assembled state on the electronic device, the shell comprising a base and one or more side walls extending generally perpendicularly therefrom, wherein the one or more side walls comprise one or more cutouts configured for receiving the one or more protrusions of the collar.

15. The case of claim 14, wherein the bumper comprises an undercut geometry-like channel configured to engage a catch of the shell.

16. The case of claim 14, wherein the bumper is held in compression between the electronic device and the shell in the assembled state.

* * * * *